(12) United States Patent
Ferris Roig et al.

(10) Patent No.: US 12,053,929 B2
(45) Date of Patent: Aug. 6, 2024

(54) BUILD UNITS FOR THREE-DIMENSIONAL PRINTERS

(71) Applicant: HEWLETT-PACKARD DEVELOPMENT COMPANY, L.P., Spring, TX (US)

(72) Inventors: Cristian Ferris Roig, Sant Cugat del Valles (ES); Tania Torm Obradors, Sant Cugat del Valles (ES); Jordi Blanch Costa, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 365 days.

(21) Appl. No.: 17/433,211

(22) PCT Filed: Apr. 29, 2019

(86) PCT No.: PCT/US2019/029673
§ 371 (c)(1),
(2) Date: Aug. 23, 2021

(87) PCT Pub. No.: WO2020/222748
PCT Pub. Date: Nov. 5, 2020

(65) Prior Publication Data
US 2022/0118706 A1    Apr. 21, 2022

(51) Int. Cl.
*B29C 64/295* (2017.01)
*B29C 64/153* (2017.01)
(Continued)

(52) U.S. Cl.
CPC .......... *B29C 64/295* (2017.08); *B29C 64/153* (2017.08); *B29C 64/165* (2017.08);
(Continued)

(58) Field of Classification Search
None
See application file for complete search history.

(56) References Cited

U.S. PATENT DOCUMENTS 5,412,181 A * 5/1995 Giamati ................. H05B 3/342
219/548
10,058,920 B2   8/2018 Buller et al.
(Continued)

FOREIGN PATENT DOCUMENTS

JP      2015225811 A  * 12/2015
WO   WO-2017194110 A1 * 11/2017 ........... B29C 64/241
(Continued)

OTHER PUBLICATIONS

Prusa, Josef, "Original Prusa I3 MK2 Release!," Prusa Printers, May 14, 2016, 12 p.

*Primary Examiner* — Mohammad M Ameen
(74) *Attorney, Agent, or Firm* — Shook, Hardy & Bacon L.L.P.

(57) ABSTRACT

A build unit for a three-dimensional printer, comprising a housing comprising sidewalls and a build platform movable within the housing. The housing and the build platform form a build chamber. The build unit further comprises a lateral heater mounted on the housing. The lateral heater is operable to apply a uniform housing temperature across all the section of the build unit by delivering variable power density along the housing.

12 Claims, 4 Drawing Sheets

(51) Int. Cl.
    *B29C 64/165*      (2017.01)
    *B29C 64/245*      (2017.01)
    *B29C 64/25*      (2017.01)
    *B33Y 10/00*      (2015.01)
    *B33Y 30/00*      (2015.01)
    *H05B 3/26*      (2006.01)

(52) U.S. Cl.
    CPC ............ *B29C 64/245* (2017.08); *B29C 64/25* (2017.08); *B33Y 10/00* (2014.12); *B33Y 30/00* (2014.12); *H05B 3/26* (2013.01); *H05B 2203/013* (2013.01)

(56) References Cited

U.S. PATENT DOCUMENTS

| | | | |
|---|---|---|---|
| 2008/0190905 A1* | 8/2008 | Heinlein | B29C 64/153 219/121.73 |
| 2015/0266238 A1 | 9/2015 | Ederer et al. | |
| 2016/0243619 A1 | 8/2016 | Gothait et al. | |
| 2018/0093455 A1* | 4/2018 | Zou | B32B 27/08 |
| 2018/0250746 A1 | 9/2018 | Symeonidis et al. | |
| 2019/0037646 A1 | 1/2019 | Chaffins et al. | |

FOREIGN PATENT DOCUMENTS

| | | | |
|---|---|---|---|
| WO | WO-2018075741 A1 | 4/2018 | |
| WO | WO-2019017886 A1* | 1/2019 | ........... B29C 64/153 |

\* cited by examiner

BUILD UNITS FOR THREE-DIMENSIONAL PRINTERS

BACKGROUND

Additive manufacturing, commonly referred to as three-dimensional or 3D printing, enables objects to be generated on a layer-by-layer basis, for example through the selective solidification of a build material.

Powder-based 3D printing systems, for example, typically form successive thin layers of a powder or particulate-type build material on a build platform within a build chamber and selectively solidify portions of each layer that represent a cross-section of a 3D object. Selective solidification techniques may include, for example, use of a printable fusing agent in combination with application of fusing energy to cause portions of the build material on which the fusing agent is printed, or applied, to absorb more energy than portions of build material on which no fusing agent is printed. The portions on which fusing agent is printed melt, fuse, and solidify to form a part of the 3D object being printed, whereas non-fused build material remains in a generally non-solidified state and may be removed.

BRIEF DESCRIPTION OF THE DRAWINGS

Various examples will be described below by referring to the following figures, in which.

DETAILED DESCRIPTION

In thermal fusing or sintering based 3D printing systems, layers of build material formed on a build platform movable inside the built unit are each selectively solidified by applying thermal energy. Successive layers of build material are formed on the top of the build platform, where thermal energy is applied causing selective portions of each layer of build material to fuse, melt or sinter.

Therefore, the build unit delimits a space for printing. The build unit is also responsible to provide and maintain an adequate temperature during the printing and cooling process.

Upon cooling, the portions which fused, melted or sintered solidify to form part of the 3D object being generated. To ensure high quality 3D printed objects, the temperature to which build material is raised into order to be satisfactory fused has to be carefully controlled.

Therefore, thermal uniformity and controlled temperatures during the preheat, the printing process, the fusing process, and the cooling process has to be guaranteed to ensure the quality of 3D printed objects. For example, for some build materials at least, a too rapid cooling may induce undesirable internal stresses into 3D printed objects. Such stresses may, for example, cause 3D printed objects, or processed layers thereof, to curl, deform, or have some other undesirable properties. An excessively slow cooling time may increase the length of time before which printed 3D objects may be made available for use after printing and may also degrade at least some mechanical properties.

However, the thermal uniformity during the preheat, the printing process and the cooling also plays a role in object quality. Different cooling rates drives to different mechanical and dimensional properties for the 3D printed object.

Thermal uniformity and controlled temperatures during the preheat, the printing process and the cooling may thus favorise 3D printed objects to have high part quality, for example having high dimensional accuracy, high interlayer strength, or the like, and may help reduce the delay before which 3D printed objects may be available for use after printing.

Figure 1:
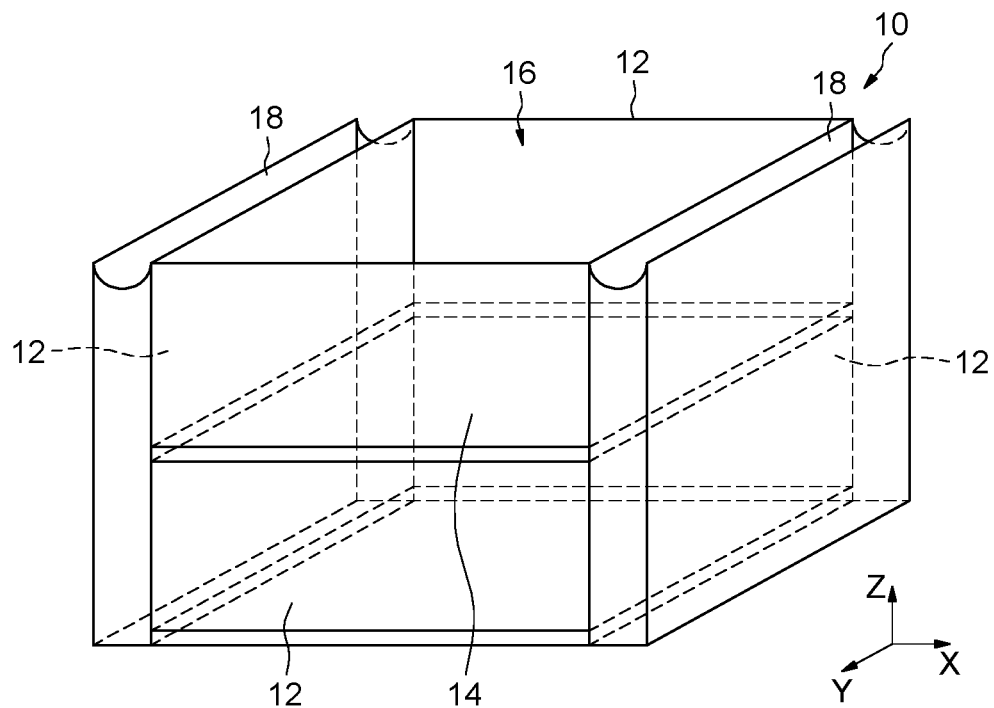
FIG. 1 shows a simplified illustration of a build unit according to one example of the present disclosure.

Referring now to FIG. 1, there is shown a build unit 10 for use in a 3D printing system according to an example.

The build unit 10 comprises lateral sidewalls 12 which form a generally open-topped housing having a rectangular-shaped base. The lateral sidewalls 12 may be connected. A movable build platform 14 is also provided which is movable vertically within the build unit 10. The sidewalls 12 and build platform 14 form a build chamber 16. Layers of build material may be formed on the build platform 14 and processed to form a 3D object within the build chamber 16. After each layer of powder is processed, the build platform 14 is moved downwards to allow a subsequent layer of build material to be formed thereon.

The build unit 10 further comprises a build material supply system that may comprise two feedtrays 18, each located on a side of the build unit 10. Each feedtray 18 contains and supplies the build material on the build platform 14. Each feedtray 18 comprises a surface (not referenced) receiving the build material. The build material supply system is not limited to the feedtray and may comprise any kinds of material spreading mechanism.

The build material supply system may comprise a vane or a plate (not shown in the Figures) for removing build material from the feedtray and forming a pile of build material adjacent a spreader or a recoater (not shown in the Figures) of the 3D printer.

The spreader or recoater may spread the pile of build material in a direction towards the platform to form a layer build material on the platform, as a first layer of build material or over previous layers which have been solidified.

The sidewalls 12 may be formed from a single sheet of material, or may be formed from individually connected sidewalls.

Each sidewall 12 of the build unit 10 may comprise one lateral heater 20. Each lateral heater 20 is operable to apply heat to the build material directly by contact between the build material and the inner faces of the sidewalls.

Figure 2:
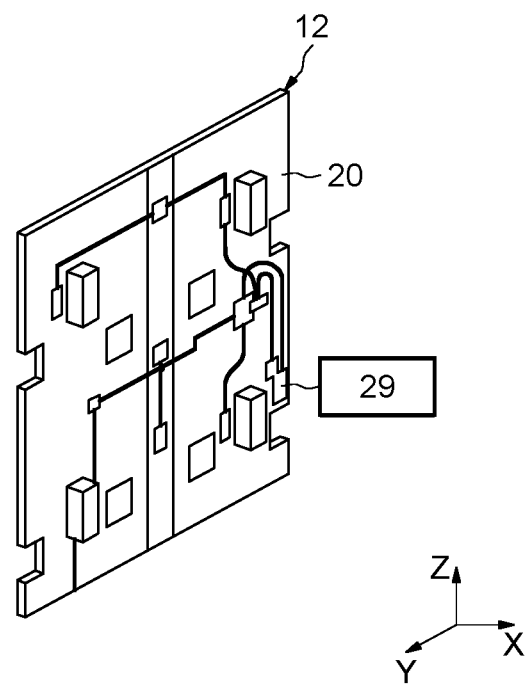
FIG. 2 illustrates a sidewall of the build unit of FIG. 1 with a lateral heater according to an example.

FIG. 2 is an example of one of the sidewalls 12 having a lateral heater 20 mounted on its outer surface. In another example, the lateral heater 20 may be mounted on the inner surface of the associated sidewall 12.

In one example, each lateral heater 20 covers the whole surface of the associated sidewall 12 and therefore provide a uniform wall temperature across all the section of the build unit 10.

In another example not shown, one lateral heater may cover the housing of the built unit. In an example not shown, one lateral heater may cover two, three or four of the sidewalls 12 of the housing.

Figure 3:
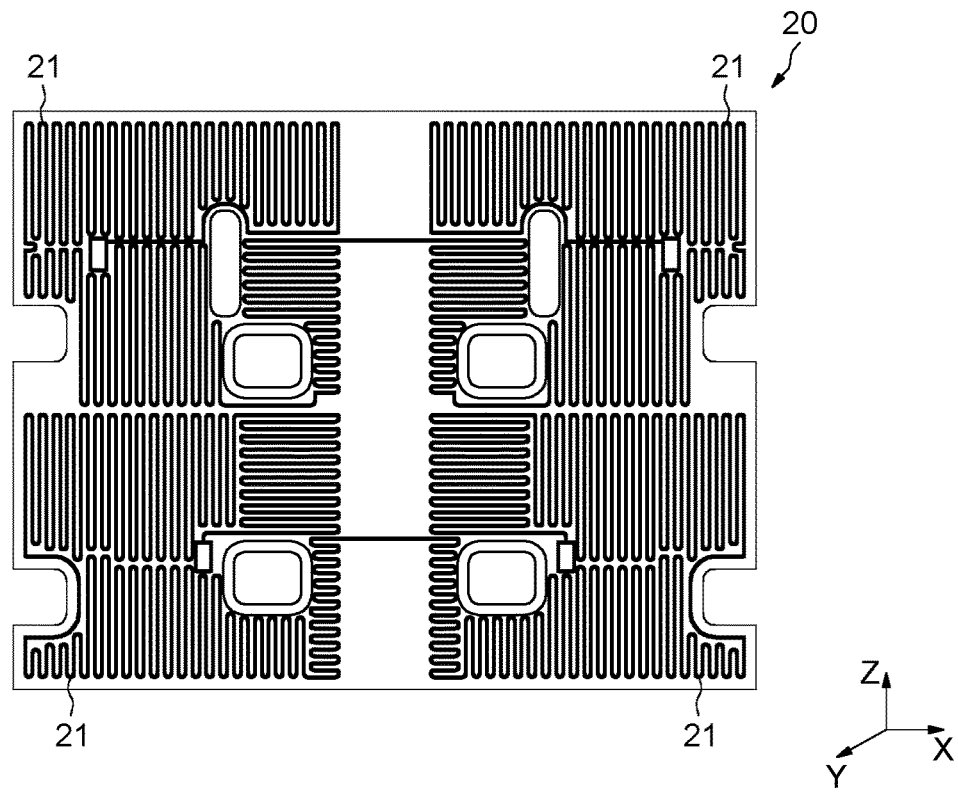
FIG. 3 is an example of a lateral heater.

An example of the lateral heater 20 is shown in detail in FIG. 3. The lateral heater 20 comprises an electrical etched resistance 21 having a wire covered two layers of silicone rubber insulation (not visible in the Figures). The etched resistance 21 is configured to deliver variable power density along the sidewall 12. Each lateral heater 20 delivers more heat flux on the corners of the build unit 10.

Figure 4:
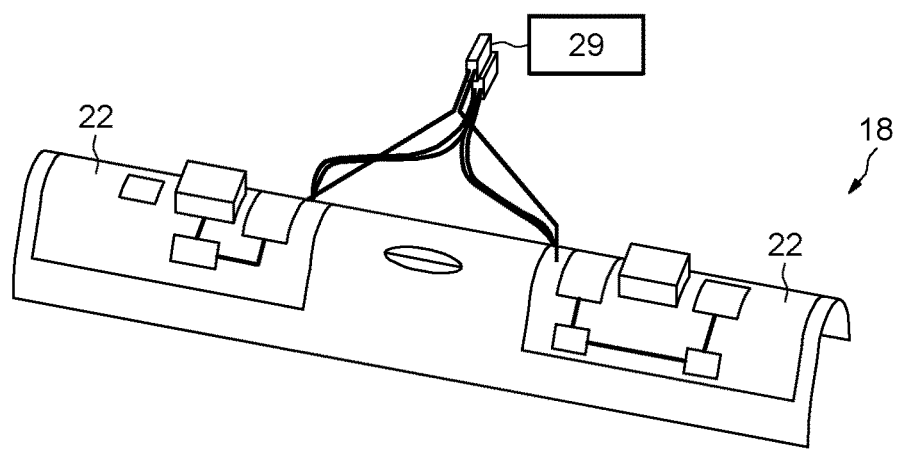
FIG. 4 illustrates the sidewall of the build unit of FIG. 1 with a feedtray heater according to an example.

As shown in FIG. 4, the build unit 10 further comprises feedtray heaters 22, each located on one of the feedtrays 18 operable to apply heat to the build material. The feedtray heater 22 is mounted on the surface of the associated feedtrays, opposite to the surface receiving the build material.

The feedtray heater 22 also comprises an electrical etched resistance not shown having a wire covered two layers of silicone rubber insulation (not shown in the Figures). The etched resistance of the feedtrays heater is configured to deliver variable power density along the feedtrays heater 22.

The wire of each heater 20, 22 is operated in a closed-feedback loop.

The design of the resistance etching of the heaters 20, 22 is configured to deliver variable power density in order to compensate thermal dissimilarities obtained due to different rates of thermal dissipation of the sidewalls and the feedtrays where the heaters are mounted.

Higher power density at the end of lateral heaters may compensate the higher thermal losses at the corner of the housing of the built unit.

Smoother profiles of temperature may be provided since the heaters 20, 22 delivers a uniform temperature profile preventing the creation of hot spots between the heaters. Furthermore, thermal defects in the printed object, for example such as coalescence, which continues after the layer of built material is buried, may be reduced or avoided as a result of a more homogenous temperature being kept along the sidewalls of the build unit.

Figure 5:
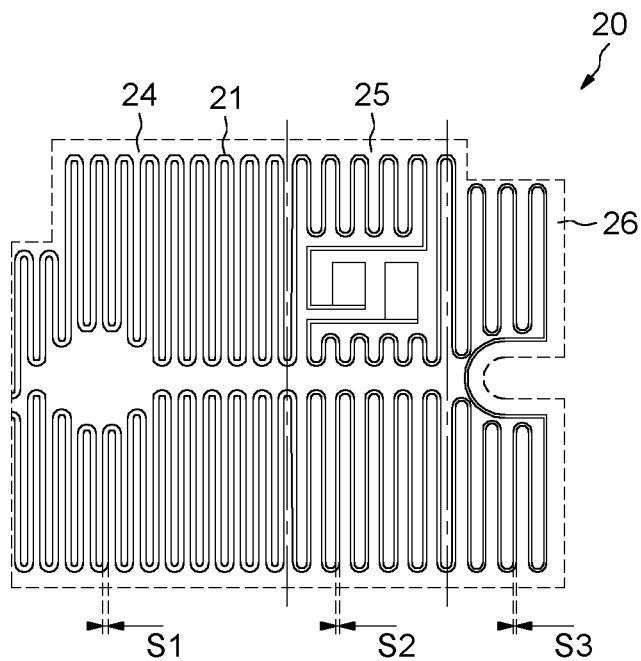
FIG. 5 and FIG. 6 are examples of an electrical etched resistance used in a lateral heater and/or a feedtray heater.

An example of an electrical etched resistance 21 used in the lateral heaters 20 is shown in FIG. 5. As shown, the cross-section of the wire of the electrical etched resistance 21 is variable along the length of the sidewall on which the heater is mounted to deliver variable power density.

In the example of FIG. 5, the electrical etched resistance 21 comprises first, second and third successive portions 24, 25, 26. The three successive portions 24, 25, 26 are schematically separated by vertically dotted lines on FIG. 5. The cross-section S3 of the wire in the third portion 26 is smaller than the cross-section S2 of the wire in the second portion 25 and the cross-section S2 of the wire in the second portion 25 is smaller than the cross-section S1 of the wire in the third portion 24. In each portion 24, 25, 26, the cross-section of the wire is constant.

As shown, the space between parts of the wire of the electrical etched resistance is constant along the length of the sidewall.

In another example not shown, the electrical etched resistance 21 may comprise two successive portions. The cross-section of the wire in one portion is smaller than the cross-section of the wire in the other portion. In another example not shown, the electrical etched resistance 21 may comprise four or more successive portions. The cross-section of the wire is different in each portion.

Figure 6:
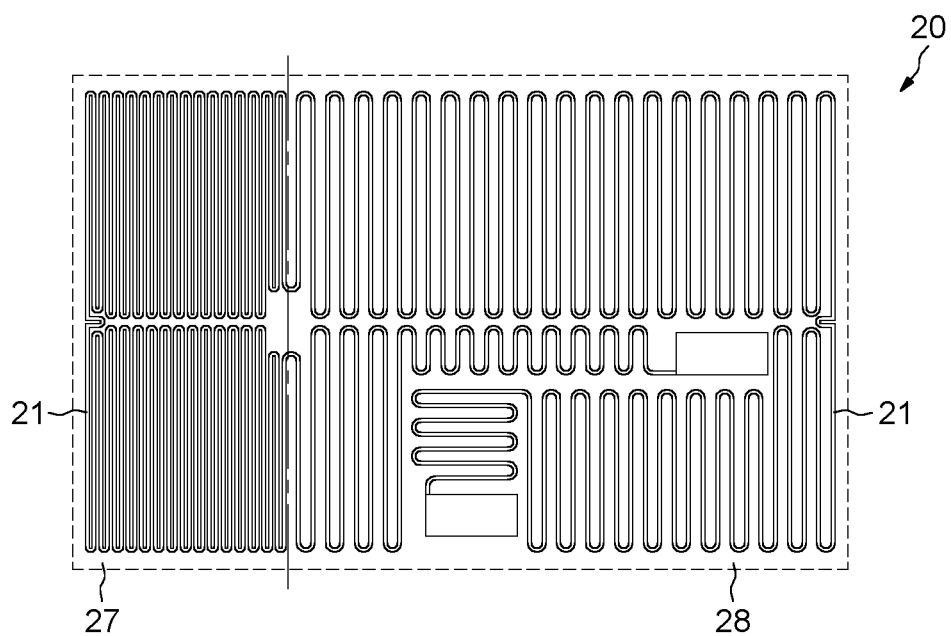

Another example of an electrical etched resistance 21 used in the lateral heaters 20 is shown in FIG. 6. As shown, the space between parts of the wire of the electrical etched resistance is variable along the length of the surface on which the heater is mounted to deliver variable power density.

In the example of FIG. 6, the electrical etched resistance 21 comprises two successive portions 27, 28. The space between parts of the wire in one portion 27 is smaller than the space between parts of the wire in the other portion 28. The two successive portions 27, 28 are schematically separated by vertically dotted lines on FIG. 6.

As shown, the cross-section of the wire is constant along the sidewall 12.

In another example not shown, the electrical etched resistance 21 may comprise three or more successive portions. The space between parts of the wire in one portion is smaller than the space between parts of the wire in the other portion.

The examples of electrical etched resistance as shown in FIGS. 5 and 6 may be used in the feedtray heaters 22 of the built unit 10.

Both examples of electrical etched resistance as shown in FIGS. 5 and 6 may be used in the different heaters 20, 22 of the printer. For example, the lateral heaters 20 may have the electrical etched resistance as designed in FIG. 5, whereas the feedtrays heaters 22 may have the electrical etched resistance as designed in FIG. 6. In another example, the lateral heaters 20 may have the electrical etched resistance as designed in FIG. 6, whereas the feedtrays heaters 22 may have the electrical etched resistance as designed in FIG. 5. In another example, the lateral heaters 20 and the feedtrays heaters 22 may have the electrical etched resistance as designed in FIG. 5. In another example, the lateral heaters 20 and the feedtrays heaters 22 may have the electrical etched resistance as designed in FIG. 6.

Heaters 20, 22 are controlled with one power channel 29, which simplifies the control and implementation of the heaters in the build unit 10, and thus reduces the cost.

By applying heat in a controlled manner, when in use, build material may be maintained within a predetermined temperature range.

Figure 7:
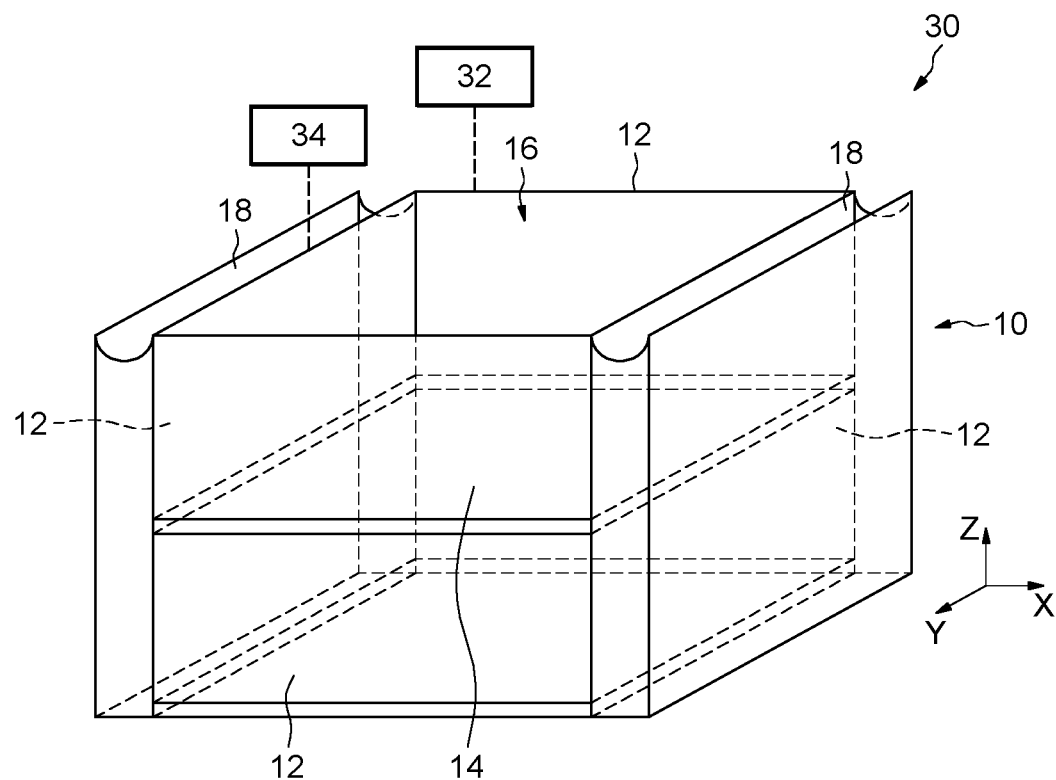
FIG. 7 shows a simplified illustration of a 3D printer having a build unit according to one example.

Referring now to FIG. 7, there is shown an example of a three-dimensional printer 30 incorporating a build unit such as the build unit 10 of FIG. 1. The three-dimensional printer 30 comprises a build material forming module 32 to form successive layers of build material on the build platform 14. A first layer of build material is formed directly on the build platform 14, whereas subsequent layers are formed on a previously formed layer. The build material forming module 32 may comprise, for example, a build material distribution module, such as a hopper, to form a volume of build material adjacent to the build unit 10, and a recoater module for spreading the formed volume of build material over the build platform. In one example, the recoater module may comprise a roller or a wiper.

Operation of the 3D printer 30 is controlled by a 3D printer controller 34. The controller 34 may control elements of the 3D printer to form layers of build material on the build platform 14.

Figure 8:
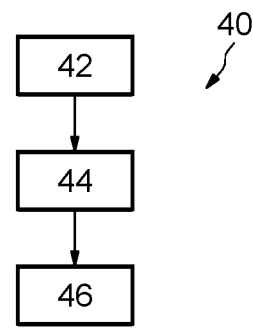
FIG. 8 is a flowchart outlining a method of operating a 3D printer according to one example.

A method 40 of operating a 3D printer according to one example is shown in FIG. 8. The operations may be performed, for example, by elements of the 3D printer illustrated in FIG. 8.

At block 42, the 3D printer is controlled to form and thermally process successive layers of build material in a build unit.

At block 44, the 3D printer, by way of the construction of the build unit, as described above, each lateral heater is operated and applies a uniform sidewall temperature across all the section of the built unit by delivering variable power density along the associated sidewall.

At block 46, the 3D printer, by way of the construction of the build unit, as described above, each feedtray heater may be operated and may apply a uniform temperature by delivering variable power density along the feedtray heater. Block 46 is optional.

In one example, when a 3D object has been generated in the build unit, the 3D printer may be controlled not to add additional layers of build material, but to lower the build platform of the build unit at the same rate as during processing of a 3D print process. In other words, the 3D printer controller 34 may control the build platform 14 to be lowered by 100 microns every 10 seconds until the build platform 104 has been lowered at least 100 times.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A build unit for a three-dimensional printer, the build unit comprising:
    a housing comprising sidewalls and a build platform movable within the housing, the housing and the build platform forming a build chamber,
    a lateral heater configured to generate a uniform temperature across the housing, the lateral heater mounted on the housing, the lateral heater comprised of an electrical etched resistance having a wire covered in at least two layers of insulation, the electrical etched resistance comprised of two or more successive portions having different cross-sections of the wire, the cross-sections of the wire being variable along a length of the sidewalls to deliver a higher power density at corners of the built unit, and
    wherein the lateral heater is operable to apply a uniform housing temperature across the build unit by delivering variable power density along the housing including delivery of the higher power density at the corners of the built unit.

2. The build unit of claim 1, comprising a plurality of lateral heaters, each lateral heater being mounted on a corresponding sidewall of the sidewalls of the build unit, each lateral heater covering a whole surface of the corresponding sidewall of the build unit.

3. The build unit of claim 1, wherein the electrical etched resistance comprises at least a first, a second, and a third successive portion, a corresponding cross-section of the wire in the third portion being smaller than a corresponding cross-section of the wire in the second portion, and the corresponding cross-section of the wire in the second portion being smaller than a corresponding cross-section of the wire in the first portion.

4. The build unit of claim 1, wherein spacing between the wire of the electrical etched resistance is variable in the two or more successive portions along the length of at least one of the sidewalls to deliver variable power density.

5. The build unit of claim 4, wherein the electrical etched resistance comprises two successive portions, spacing between the wire in one successive portion being smaller than spacing between the wire in the other successive portion.

6. The build unit of claim 1, wherein the lateral heater is controlled with one power channel.

7. The build unit of claim 1, further comprising a feedtray supplying build material on the build platform, and a feedtray heater mounted on the feedtray and operable to apply heat to the build material by delivering variable power density along the feedtray heater.

8. The build unit of claim 7, wherein the feedtray heater comprises an electrical etched resistance having a wire covered with at least two layers of insulation.

9. The build unit of claim 8, wherein a cross-section of the wire of the electrical etched resistance is variable along a length of the feedtray heater to deliver variable power density.

10. The build unit of claim 8, wherein spacing between the wire of the electrical etched resistance of the feedtray is variable along a length of the feedtray heater to deliver variable power density.

11. A build unit for a three-dimensional printer, the build unit comprising:
    a housing comprised of connected sidewalls and a build platform movable within the housing, the housing and the build platform forming a build chamber;
    a plurality of lateral heaters configured to generate a uniform temperature across the housing, each lateral heater being mounted on an associated sidewall of the connected sidewalls, each lateral heater covering a whole surface of the associated sidewall, each lateral heater comprised of an electrical etched resistance having a wire covered in at least two layers of insulation, the electrical etched resistance comprised of two or more successive portions having different cross-sections of the wire, the cross-sections of the wire being variable along a length of the associated sidewall to deliver a higher power density at corners of the built unit, each lateral heater configured to deliver variable power density along the associated sidewall;
    a feedtray supplying build material on the build platform; and
    a feedtray heater mounted on the feedtray, the feedtray heater comprised of an electrical etched resistance configured to deliver variable power density along the feedtray heater and covered with at least two layers of insulation.

12. A method of operating a three-dimensional printer, the method comprising:
    forming and thermally processing successive layers of build material in a built unit, the build unit comprised of a housing that comprises a plurality of connected sidewalls, a build platform movable within the housing to form a build chamber, and a plurality of lateral heaters mounted to the plurality of connected sidewalls, each of the lateral heaters comprised of an electrical etched resistance having a wire covered in at least two layers of insulation, the electrical etched resistance comprised of two or more successive portions having different cross-sections of the wire, wherein the cross-sections of the wire are variable along a length of the plurality of sidewalls to deliver a higher power density at corners of the built unit; and
    operating each lateral heater of the plurality of lateral heaters to generate a uniform temperature across all of the plurality of connected sidewalls of the build unit by delivering variable power density along the associated sidewall including delivery of the higher power density at the corners of the built unit.

* * * * *